United States Patent [19]

Eaton

[11] 4,122,525
[45] Oct. 24, 1978

[54] METHOD AND APPARATUS FOR PROFILE SCANNING

[75] Inventor: Homer L. Eaton, Balboa, Calif.

[73] Assignee: Eaton-Leonard Corporation, Santa Ana, Calif.

[21] Appl. No.: 704,408

[22] Filed: Jul. 12, 1976

[51] Int. Cl.² ............................................. G01N 21/22
[52] U.S. Cl. .................................... 364/560; 356/167; 250/561
[58] Field of Search ............... 364/560, 561, 562, 563, 364/564; 356/158, 156, 160, 167; 269/46–47; 250/559–561

[56] References Cited

U.S. PATENT DOCUMENTS

| | | | |
|---|---|---|---|
| 3,628,032 | 12/1971 | Senior et al. | 250/219 LG |
| 3,656,855 | 4/1972 | Collart et al. | 356/167 |
| 3,890,509 | 6/1975 | Maxey | 250/561 |
| 3,901,606 | 8/1975 | Watanabe et al. | 356/159 |
| 3,927,948 | 12/1975 | Cox et al. | 356/167 |
| 3,963,938 | 6/1976 | Sanglert et al. | 250/561 |
| 3,980,870 | 9/1976 | Kawahara | 235/151.3 |
| 3,983,368 | 9/1976 | Csakvary et al. | 235/151.3 |
| 3,983,403 | 9/1976 | Dahlstom et al. | 250/560 |

Primary Examiner—Edward J. Wise
Attorney, Agent, or Firm—Gausewitz, Carr & Rothenberg

[57] ABSTRACT

Inspection and verification of configuration of a bent tube is achieved by placing the tube upon a conveyor that moves past a pair of mutually orthogonal optical scanners. Interruptions of a light beam at boundaries of the passing tube are used together with the known beam scan pattern and the known position of the conveyor in the course of its movement to generate signals that define coordinates of vertical and horizontal projections of the tube boundary. From these coordinates the desired tube data can be determined and compared with a reference, thereby comparing tube configuration with a reference configuration.

48 Claims, 10 Drawing Figures

METHOD AND APPARATUS FOR PROFILE SCANNING

BACKGROUND OF THE INVENTION

The present invention relates to measurement of object configurations and more particularly concerns determination of three dimensional configurations. Methods and apparatus of the invention may be employed to obtain different profiles of the same object to facilitate definition of three dimensional configuration of the object.

Inspection of configuration of manufactured parts is frequently necessary and always desirable, yet difficult, expensive and time consuming. Commonly, such configuration inspection requires direct measurement of different elements and features of the manufactured article. In the maufacture of bent tube, such as automobile exhaust pipe for example, in which a number of straight portions are connected by several bends, it is necessary to measure in three dimensions the axes of the several straight portions in order to define the length of the straight portions, the angle of the bend between adjacent straights and the angle of the plane of one bend with respect to the plane of another bend. Commonly, such measurements are made by a probe mounted for translation or motion along three coordinate axes as, for example in the machines shown in U.S. Pat. Nos. 3,774,311 to Stemple and 3,774,312 to Sesch. These machines are of limited application because the size of the machine itself determines the size of the object that may be measured. Costs increase rapidly with increasing size. In such machines it is exceedingly difficult to maintain precision of position and motion of traveling cantilevered elements. In addition to these and other problems, such machines require time consuming physical manipulation to make contact with the object being measured at a number of different points. Such manipulations require a skilled or at least a trained and experienced operator.

A significant improvement in such three dimensional measuring devices is described in my prior U.S. patent for Method and Apparatus for Measuring Direction, U.S. Pat. No. 3,944,798, in which a five axis articulated probe has a working head that may be oriented in three dimensions so as to align itself with any straight portion of the tube. This arrangement permits measurement of the vector that is parallel to a tube axis to be made with but a single operation. Nevertheless, even with this improved instrumentation the object being measured, whether a tube or some other object with a three dimensional configuration that is to be determined and inspected, must be clamped to a support and then contacted with the measuring instrument at least once for each straight portion in order to obtain the desired information. This operation is time consuming and may cause undesired delay, particularly in quantity production or where many parts must be carefully inspected as rapidly as possible.

Optical scanning devices for making a single measurement such as a width or thickness, are well known. Examples of such devices are shown in the U.S. Pat. No. 3,533,701 to Hruby et al and in U.S. Pat. No. 3,615,139 to Bostrom. In these patents a light beam is moved across an object to be measured and the time of occlusion of the light beam by the object is employed as a measure of the distance across the object. These devices are useful for measurement of but a single dimension and cannot obtain any three dimensional configuration measure. The scanning beam moves only in a single direction relative to the object being measured.

The U.S. patent to Danielson et al U.S. Pat. No. 2,954,266, employs an arrangement for measuring the pitch of a helix in which a helical object is moved past a light source and a pair of relatively movable optical gratings are employed for inspection of pitch uniformity of a traveling wave tube helix. Only a single measurement along a single axis is made. No three dimensional measurement or inspection is possible.

Accordingly, it is an object of the present invention to provide methods and apparatus for inspection and measurement of configuration which avoid or minimize above-described problems and limitations of prior art devices.

SUMMARY OF THE INVENTION

In carrying out principles of the present invention, in accordance with a preferred embodiment thereof, profile of an object is scanned by moving a scanning beam across the object in a scan pattern, relatively moving the object and the pattern, and generating signals that collectively define points of intersection of the beam scan pattern with a boundary of the object. For three dimensional scanning, a second scan of the object is made, angulated relative to the first scan. For this second scan, in one embodiment, a second scanning beam is moved across the object in a second scan pattern and projected in a direction that is angulated with respect to the direction of projection of the first scanning beam and also with respect to the direction of relative motion of the object and the scan patterns. The object is also moved relative to the second scan pattern. Signals are generated that collectively define intersections of the second scan pattern with the object boundary. Alternatively, the object is rotated relative to the scanner which is then employed for the second scan. The two scans collectively define the object in three dimensions.

DETAILED DESCRIPTION

A mechanization of the invention will be described in connection with the measurement and inspection of a bent tube such as an automobile exhaust pipe, for example. Nevertheless, it will be readily appreciated that principles of the present invention, and indeed the described embodiments themselves, may be applicable for measurement and inspection of many other types of manufactured objects, the nature of the object to which the scanning of the present invention may be applied being limited mainly by the size of the object with respect to the scanning apparatus.

Figure 1:
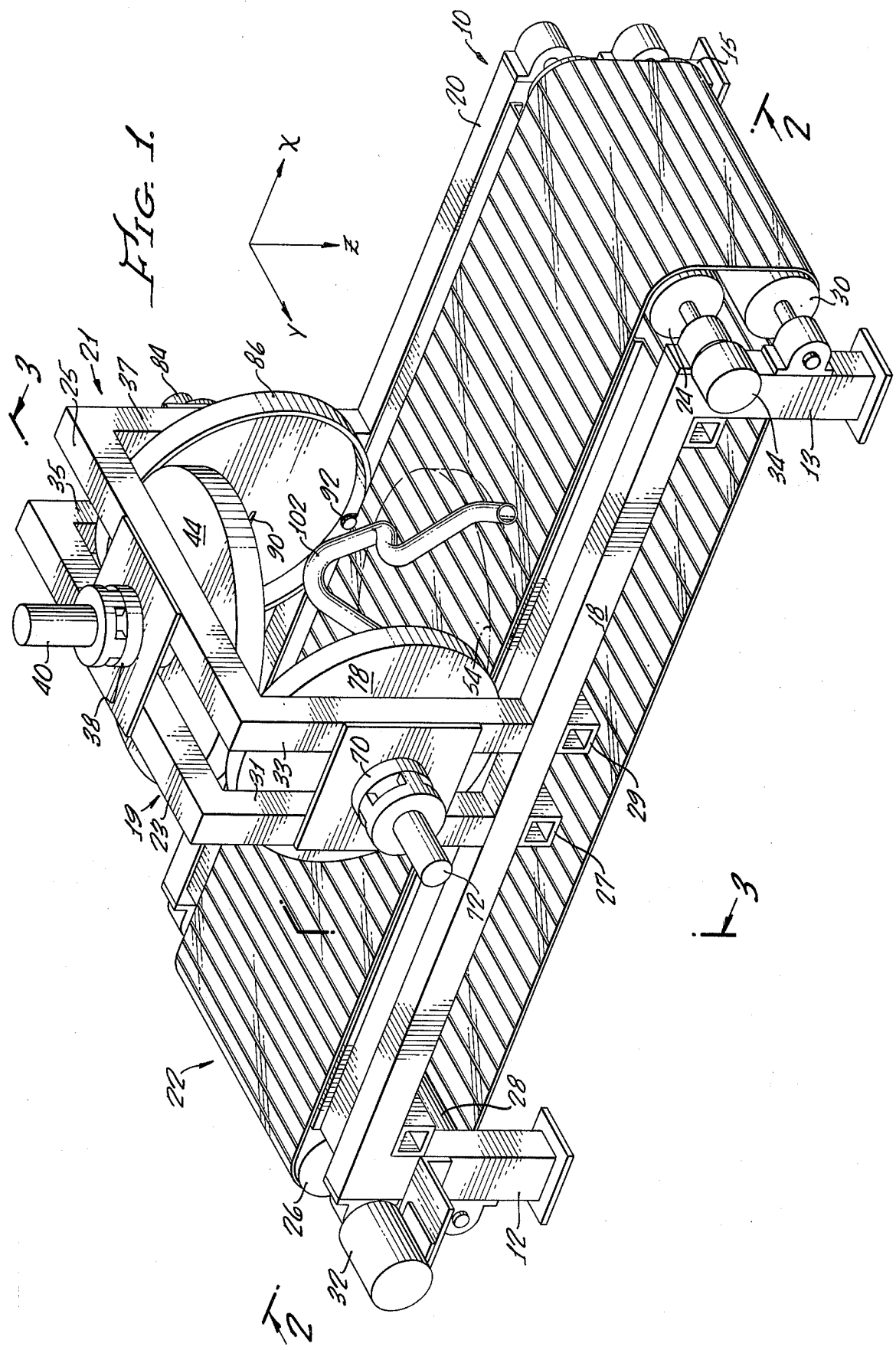
FIG. 1 is a perspective view of a scanning apparatus embodying principles of the present invention.

The scaning apparatus illustrated in FIG. 1 permits a complete measurement and inspection, in three dimensions, of a bent automobile exhaust pipe or other similar bent tube, simply by placing the pipe upon a moving platform in any convenient relation with respect to the platform. The object or tube being measured is carried by the platform past a pair of scanning devices which include apparatus for collectively generating signals that define coordinates of intersections of the scanning light beams with a boundary of the object. The coordinates are in two orthogonal planes and thus define two orthographic projections of the tube. Orientation of the tube upon the conveyor need not be known since it is desired to define one part of the tube relative to another part of the tube. Thus the tube can be placed upon the conveyor in any orientation and position that allows it to pass through the scanning region, but such orientation and position must remain fixed through a complete measurement.

The orthographic projections or the intersection coordinates themselves may then be employed to calculate three dimensional tube data. Such tube data comprises information that defines the tube configuration, such as, for example, the length of the tube from end to end, the length of each straight portion, the angle of each bend, and the plane of each bend. This information may be compared with standard data for the tube being inspected. Thus, an inspection and comparison of many tubes is simply achieved without handling the tubes any more than is necessary to place them upon the moving platform.

A scanner support comprises a frame 10 having four or more upright standards 12, 13, 14 and 15 interconnected by horizontal frame members 18, 20. An endless slatted conveyor belt 22 is entrained over a number of rollers 24, 26, 28 and 30 that are journalled in standards 12, 13, 14 and 15. A motor 32 carried by the frame 10 is connected to drive one of the rollers, such as roller 26 and thus drive the slatted conveyor 22 at fixed speed. Conveyor 22 is made of a number of movably interconnected slats of transparent material.

A conveyor position detector 34, such as a conventional incremental encoder, is mounted on one of the rollers, such as roller 24, and has an input shaft that is rotated together with the rotation of the roller so as to provide from the detector encoder 34 a series of pulses each of which denotes an increment of rotation of the roller and thus an increment of motion of the conveyor 22.

A pair of inverted U-shaped scanner support members 19, 21 are fixed to horizontal frame members 18, 20, straddling the conveyor 22 to form therewith an enclosed scanning zone through which the conveyor and a tube thereon may pass. Fixedly mounted to horizontal upper legs 23, 25 of support members 19, 21 is a synchronous motor 38 having a rotatable hollow shaft 39. Mounted atop the motor 38 is a highly collimated light source, such as a laser 40, which projects a narrow light beam through the hollow motor shaft 39 to a first mirror 42 carried at the center of a heavy fly wheel type disc 44 that is fixed to the motor shaft for rotation therewith.

Figure 2:
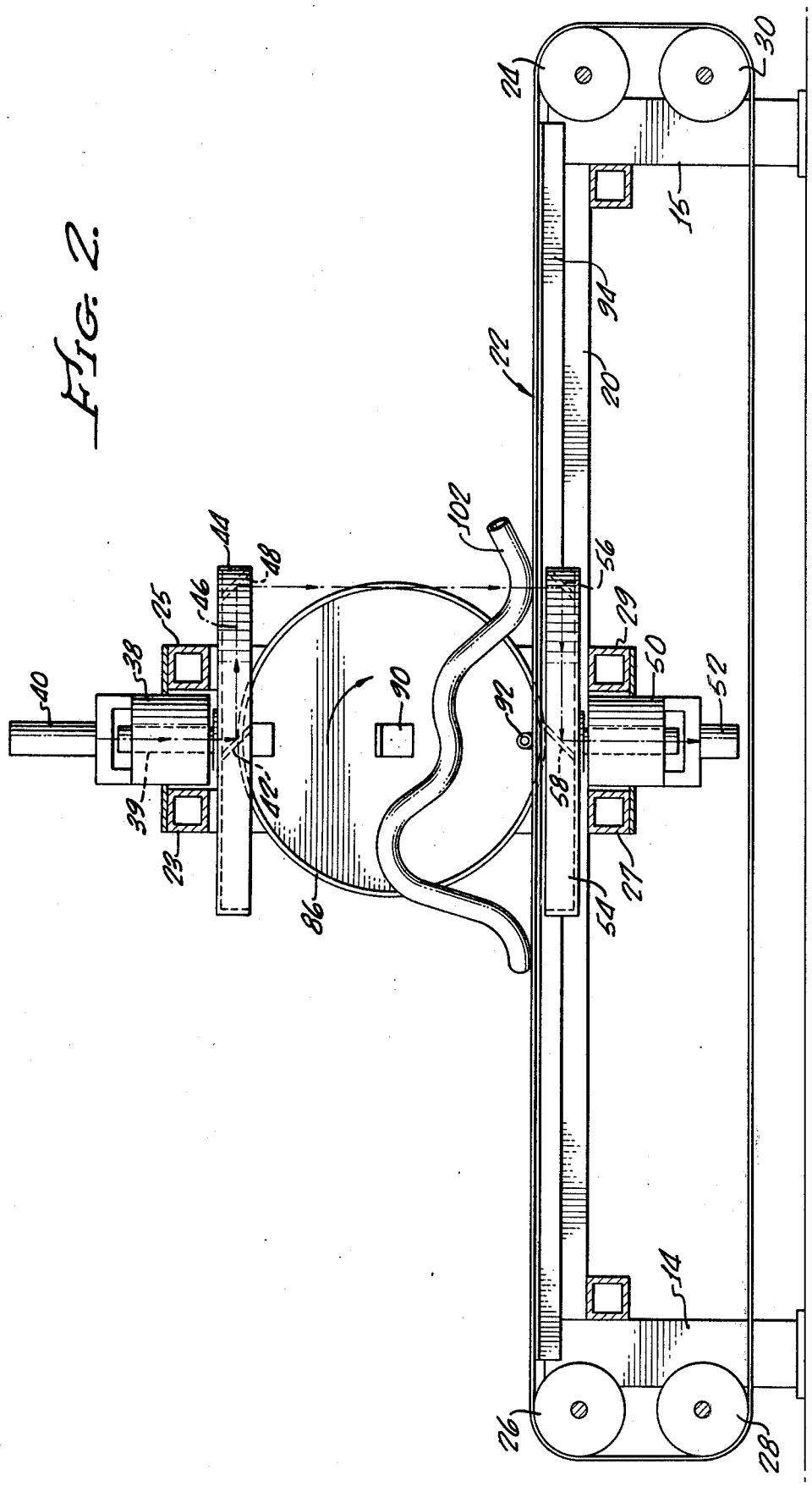
FIG. 2 is a side view of the apparatus of FIG. 1.

The disc 44 is constructed to provide a light path 46 (FIG. 2) extending radially through the disc from its first mirror 42 (which is positioned at an angle 45° with respect to the disc axis and motor axis, and with respct to the beam projected from the laser), to a second mirror 48 mounted at the periphery of the disc at an angle of 45° to the path 46.

A second synchronous motor 50 is fixed to frame members 18, 20 by means of fixed cross members 27, 29 beneath the upper section of conveyor 22. Motor 50 has a similar hollow shaft and fixedly carries a laser target, such as a photo-cell 52 that receives light projected through the axis of the hollow shaft of motor 50.

A second flywheel type disc 54 is fixed to the shaft of motor 50 for rotation therewith on the other side (immediately below) conveyor 22 and likewise includes a pair of 45° mirrors 56, 58 at its periphery and center respectively.

The two motors and two discs are all coaxial with one another, and the two synchronous motors are driven in synchronism by a common electric signal. One of the motors such as motor 50, for example, is mounted so that its housing may be rotationally adjusted about the motor axis by an adjusting mechanism (not shown) in order to provide for synchronization of the phasing of the two discs 44, 54.

Photo-cell 52 in effect comprises a moving target since it receives light that is projected along a vertically oriented circular cylindrical pattern as the discs 44, 54 revolve. A fixed target, such as a photo-cell 64, is mounted above the disc 54 and just below conveyor upon a bracket 66 that is fixed to lower frame member 18 so as to receive the beam projected downwardly by mirror 48 at a fixed reference point in the circular scanning pattern of this beam.

A horizontal scanning arrangement substantially identical to the above described vertical scanning arrangement is also mounted on the scanner frame 10. Thus, a third synchronous motor 70 having a hollow shaft is fixedly mounted on vertical legs 31, 33 of scanner support members 19, 21 and carries a second collimated light source, such as a laser 72, which projects a beam of light through the motor shaft for reflection by mirrors 74, 76 of a heavy flywheel-like disc 78, substantially identical to disc 44. Disc 78 is coaxial with the motor 70 and rotated therewith about the horizontal axis of the motor.

A target arrangement similar to the target arrangement of the vertical scan is provided in the form of a fourth synchronous motor 82 carried on vertical legs 35, 37 of scanner support members 19, 21 and having a hollow shaft and mounting a laser target in the form of a second photocell 84. A fourth heavy flywheel-like disc 86 is coaxial with the shaft of motor 82 and connected to be rotated thereby. Disc 86 carries 45° mirrors 88, 90 which reflect a beam of light projected horizontally in a circular cylindrical pattern from mirror 76 through the axis of motor 82 for reception by the second detector 84. The two motors 70 and 82 are driven in synchronism by the same or identical electrical signals. The housing of motor 82 is provided with a rotational adjustment mechanism (not shown) to adjustably position its motor about its axis with respect to the frame 10 in order to allow adjustment of the relative phases of rotation of the two motors 70, 82.

Just as in the vertical directed beam scan a horizontal beam reference target, such as a photo-cell 92, is carried between discs 78, 86 upon a bracket 94 that is fixed to frame memer 20. Thus, detector 92 will intercept the horizontally directed beam of laser 72 at one point in each scan cycle.

Conveniently, the two motor pairs are driven at the same speed. Synchronization between the one pair of motors 38, 50 and the other pair 70, 82 is not needed. In fact, the two pairs of motors need not even be driven at the same rotary speed although speeds that are equal or nearly equal are preferred. Fundamentally the horizontal and vertical scanning systems are completely independent of one another but it convenient to make the two similar or identical in construction and operation.

The various signal detectors, photo-cells 52 and 84 and the position encoder 34 of the conveyor 22, generate signals that collectively define intersections of the cylindrical patterns of the scanning beams with the bouandary of a tube 102 upon the conveyor as the tube passes the scanners. More specifically, a three dimensional coordinate system is established in a fixed relation with respect to the moving conveyor and, therefore, fixedly related to an object carried on the conveyor. Such as an X, Y, Z coordinate system is shown in FIG. 1 in relation to the scanning apparatus. Photo-cell 52 and position encoder 34 collectively generate signals that define a first pair of coordinated $(x, y)$ of a intersection of the vertically directed scanning beam with a boundary of the tube (e.g. with a projection of the tube on a vertical plane). Similarly, photo-cell 84 and encoder 34 collectively generate signals that define coordinates $x, z$ of the intersection of the horizontal beam with the tube boundary.

The geometry of this definition of the intersection coordinates may be described in connection with FIGS. 5 and 6.

Figures 5, 6:
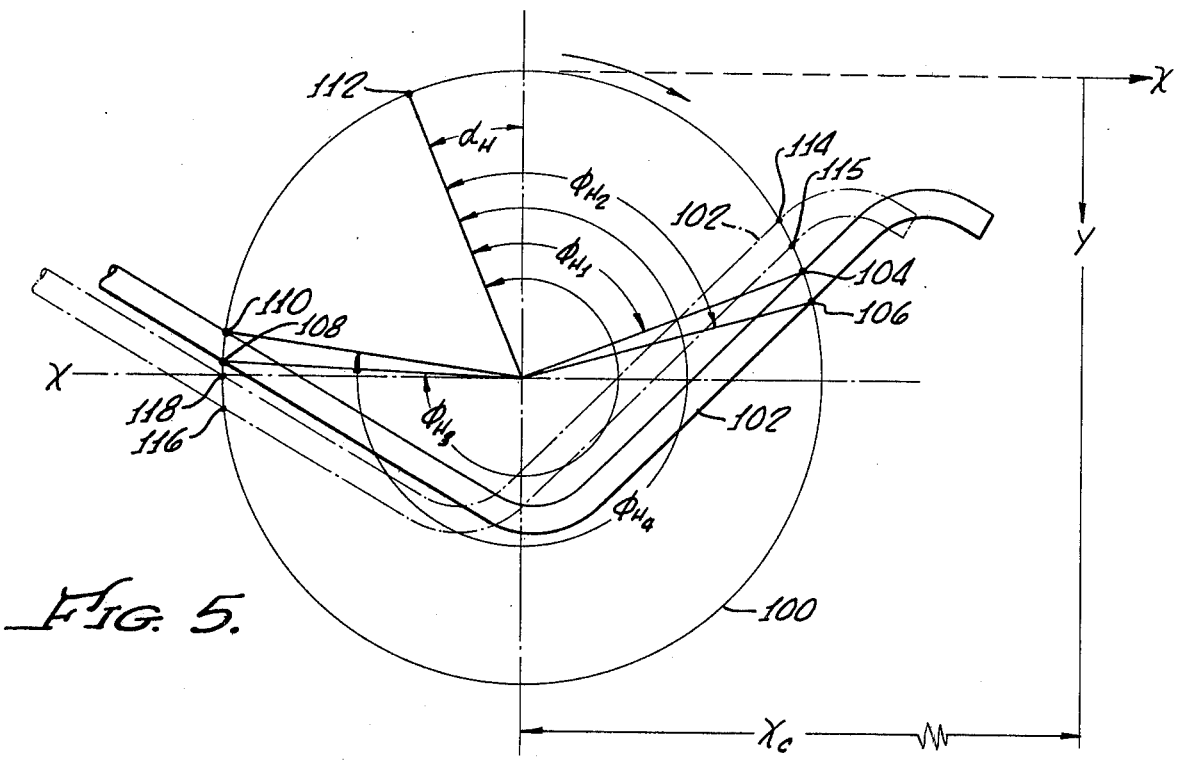
FIG. 5 illustrates a vertical scan pattern and geometry that defines coordinates of the boundary of a projection on a vertical plane of the object being scanned.
FIG. 6 illustrates a horizontal scan pattern and geometry that defines coordinates of the boundary of a projection on a horizontal plane of an object being scanned.

Illustrated in FIG. 5 is the horizontal projection 100 of the circular cylindrical scan pattern of the vertically directed scanning beam produced by laser 40. Shown superimposed upon the scan pattern are horizontal projections (e.g. projections on a horizontal plane) of first and second successive positions of a bent tube 102 that is carried past the scanner by the conveyor. The first position of the tube is indicated in solid lines. The second position of the tube, which occurs at some later time as the conveyor moves the tube past the scanner, is shown in dotted lines. Thus, it is assumed for the purposes of this exposition, that the conveyor is moving the tube fom right to left as viewed from the top and looking down upon this scan pattern projection upon a horizontal plane.

The cylindrical scan of the vertically directed beam intersects the boundaries of the tube (in its solid line position) at points 104, 106, 108 and 110 in a single scan. Cordinates of these points may be identified as $x_1, y_1, x_2, y_2, x_3, y_3, x_4, y_4$ in a three dimensional coordinate system having X and Y axes as is illustrated in the upper right hand portion of FIG. 5 and having a Z axis extending through the intersection of the X and Y axes normal to the plane of the paper. The X axis is conveniently chosen to be tangent to the scan pattern and parallel to the direction of linear travel of the conveyor. The other axes are also arbitrarily positioned but oriented parallel to the respective vertical and horizontal axes of the scanners. This coordinate system is established as being fixed to and moving with the conveyor. It is therefore fixed to and moving with the tube on the conveyor. As the conveyor moves, intersections of the tube boundary and the scan pattern occur at different points and thus a number of different points along the length of the tube boundary are intersected by successive scans of the vertically directed beam. The speed of rotation of the beam is considerably greater than the speed of the horizontal linear travel of the conveyor and tube. In an embodiment presently preferred, the relative speeds are such that each scan of the vertically directed beam will intersect the tube at a point approximately 0.2 inches from a corresponding intersection of a previous scan, as measured along the X axis. For greater resolution, that is, to obtain a larger number of coordinate points for any inspection and measurement, one merely increases the differential speed between beam motion in its scan pattern and conveyor motion along the X axis. In other words, to increase resolution, one decreases the conveyor speed or increases the speed of rotation of the scanning beam, or both. As will be more particularly explained below, measurements cf the beam position within its scan are made with respect to the reference target 64 which is indicated in FIG. 5 by a reference point 112.

The X coordinate $x_1$ of intersection 104 is defined as follows:

$$x_1 = x_{C1} - R \sin(\theta_{H1} - \alpha_H) \qquad \text{Eq.(1)}$$

wherein $x_{C1}$ is the distance between the center of the scan pattern 100 and the coordinatre system origin at the time of intersection of the beam with the tube boundary, R is the radius of the circular projection of the scan pattern, $\theta_{H1}$ is the angle between the radius of the pattern to reference point 112 and a radius of the pattern to intersection 104, and $\alpha_H$ is the angle between the pattern radius to reference point 112 and the radius parallel to the Y axis.

Similarly, the Y coordinate of intersection 104 is defined by $$Y_1 = R - R \cos(\theta_{H1} - \alpha_H) \qquad \text{Eq.(2)}$$

Measurements are made based upon pulses produced by a fixed repetition rate pulse generator to be more particularly described hereinafter. Thus $\alpha_H$ is equal to $K_1 K_2$ where $K_1$ is the number of such pulses that occur in the time required for the beam to travel through the reference angle $\alpha_H$ and $K_2$ is the angular distance through which the beam travels along its scan pattern in the interval between two successive pulses. Thus, we may write:

$$x_1 = x_{C1} - R \sin[(N_{H1} - K_1) K_2] \qquad \text{Eq.(3)}$$

and $$Y_1 = R [1 - \cos(N_{H1} - K_1) K_2] \qquad \text{Eq.(4)}$$

in which $N_{H1}$ is the number of pulses occurring in the time required for the beam to travel from refence point 112 to intersection 104. A first pair of coordinates $x_1, y_1$ of an intersection 104 of the beam with a horizontal projection of the tube boundary is thus defined by equations (3) and (4) in terms of fixed quantities R, $K_1$ and $K_2$ and variable quantities $x_{C1}$ and $N_{H1}$. As will be described below, the quantity of $x_{C1}$ is obtained from the incremental encoder 34 that detects position of the conveyor in its travel and $N_{H1}$ is determined by a count of pulses of the pulse train to the point of intersection.

Thus, in a single complete scan of the illustrated tube, the beam intersects the tube boundary at four points, being occluded at 104, again reaching the photo-cell at 106, again occluded at 108, and once again reaching the photo-cell at 110. In a subsequent scan the tube has moved to the position shown in dotted lines in FIG. 5 and four different points of intersection occur and thus many x, y (and x, z) pairs of coordinates are generated over the length of the tube, all in the same coordinate system, which is fixed with respect to the tube.

Illustrated in FIG. 6 is a geometric relation analgous to that of FIG. 5 showing a projection of the horizontally directed beam upon a vertical plane to produce the vertical projection 120 of the scan pattern of the beam produced by laser 72. Also illustrated is the projection 122, on a vertical plane, of the tube in a single position of its passage across the scanners. In the course of one scan, the horizontally directed beam will intersect the tube boundary at points 124, 126, 128 and 130. Coordinates of these intersections in the same X, Y, Z coordinate system, of which axes X and Z are illustrated in FIG. 6, are obtained for each full scan cycle. In the X, Z plane of the coordinate system, measurements of the position of the beam in its scan are made with respect to a reference point 132 that is defined by the location of the photo-cell 92. The $x$ coordinate of intersection 124 is defined as $$x_1 = x_{C1} - R \sin(\theta_{\nu 1} - \alpha_\nu) \quad \text{Eq.(5)}$$

where $x_{C1}$ is the distance from the coordinate origin along the X axis to the center of the horizontally directed beam scan pattern, R is the radius of this scan pattern, $\theta_{\nu 1}$ is the angle between a radius to the reference point 132 and the pattern radius to the intersection point 124, and $\alpha_\nu$ is the angle between a radius to the reference point 132 and a radius parallel to the Z axis. Although the equations employ a symbol R that is the same for both the vertical and horizontal projections, indicating that the vertical and horizontal beams scan in patterns of equal radii, it will be readily understood that the radii of the two patterns may differ from one another.

The Z coordinate of intersecton 124 is defined by $$z_1 = R - R \cos(\theta_{\nu 1} - \alpha_\nu) \quad \text{Eq.(6)}$$

$\alpha_\nu$ may be set equal to $K_3 K_4$, where $K_3$ is the number of pulses that occurs in the time required for the beam to travel through the reference angle $\alpha_\nu$ and $K_4$ is the angular beam travel distance per pulse of the generated train of fixed repetition rate pulses. Where a single pulse train is employed for measurement of both the horizontal and vertical scanning $K_2$ is equal to $K_4$. Coordinates of intersection 124 of the beam with the projection of the tube upon a horizontal plane are defined as follows:

$$x_1 = x_{C1} - R \sin[(N_{\nu 1} - K_3)K_4] \quad \text{Eq.(7)}$$

$$z_1 = R[1 - \cos(N_{\nu 1} - K_3)K_4] \quad \text{Eq.(8)}$$

$N_{\nu 1}$ is the number of pulses occurring in the time required for the beam to travel from reference point 132 to the intersection 124. Again, the coordinates $x_1, z_1$ which define the intersection 124 are themselves defined in terms of fixed values R, $K_3$ and $K_4$ and variable values $x_C$ and $N_{\nu 1}$. Variable value $x_C$ is the read-out of the incremental conveyor position encoder 34 at the time of intersection of the horizontally directed beam with the tube boundary at point 124. At this time, a number of pulses $N_{\nu 1}$ have been counted.

Thus, for each of the beams the vertical beam and the horizontal beam, each successive scan intersects the tube at at least two points on its boundary and each pair of points produced upon each scan is displaced along the tube with respect to the pair of a prior scan.

The many pairs of coordinates x, y of the beam intersections with the projection of the tube boundary on a horizontal plane are readily employed to define the horizontal projection of the tube, either graphically or in computer. The pairs of coordinates x, z of the horizontal beam intersections with the projection of the tube boundary on a vertical plane are readily employed to define the vertical projection, either graphically or in the computer. The two orthographic projections may be combined to define the three dimensional configuration of the tube and thus, yield the desired tube data.

It will be seen that the object is subjected to two separate and independent, but spatially correlated and mutually angulated scans. Each scan is in two dimensions, moving the scanning beam across the object with components of motion relative to the object that are parallel to two mutually orthogonal axes. In effect the beam of laser 40 scans the object along (and parallel to) X and Y axes and the beam of laser 72 scans along (and parallel to) X and Z axes. Although this is achieved by rotary motion in the preferred embodiment, it can also be achieved by linear reciprocating motion of the lasers (in synchronism with their targets, or with fixed target and parabolic reflector) along the Y and Z axes.

The two mutually angulated scans are correlated by use of spatially correlated axes. One axis of each scan has a known relation to one axis of the other scan. Conveniently, although not necessarily, this relation is coincidence, that is, the X axis is common to both scans.

Although the preferred system employs a moving conveyor and fixed scanner assemblies, it is contemplated that the conveyor be eliminated, providing a fixed transparent support, and the entire scanning assembly be moved along the frame. The reciprocating scanner support of the embodiment of FIGS. 8–10, described below, may be readily modified to carry a pair of orthogonal scanners for use with such a fixed transparent platform. Further, scanning patterns other than the described cylindrical patterns may be employed without departing from principles of this invention.

Figure 7:
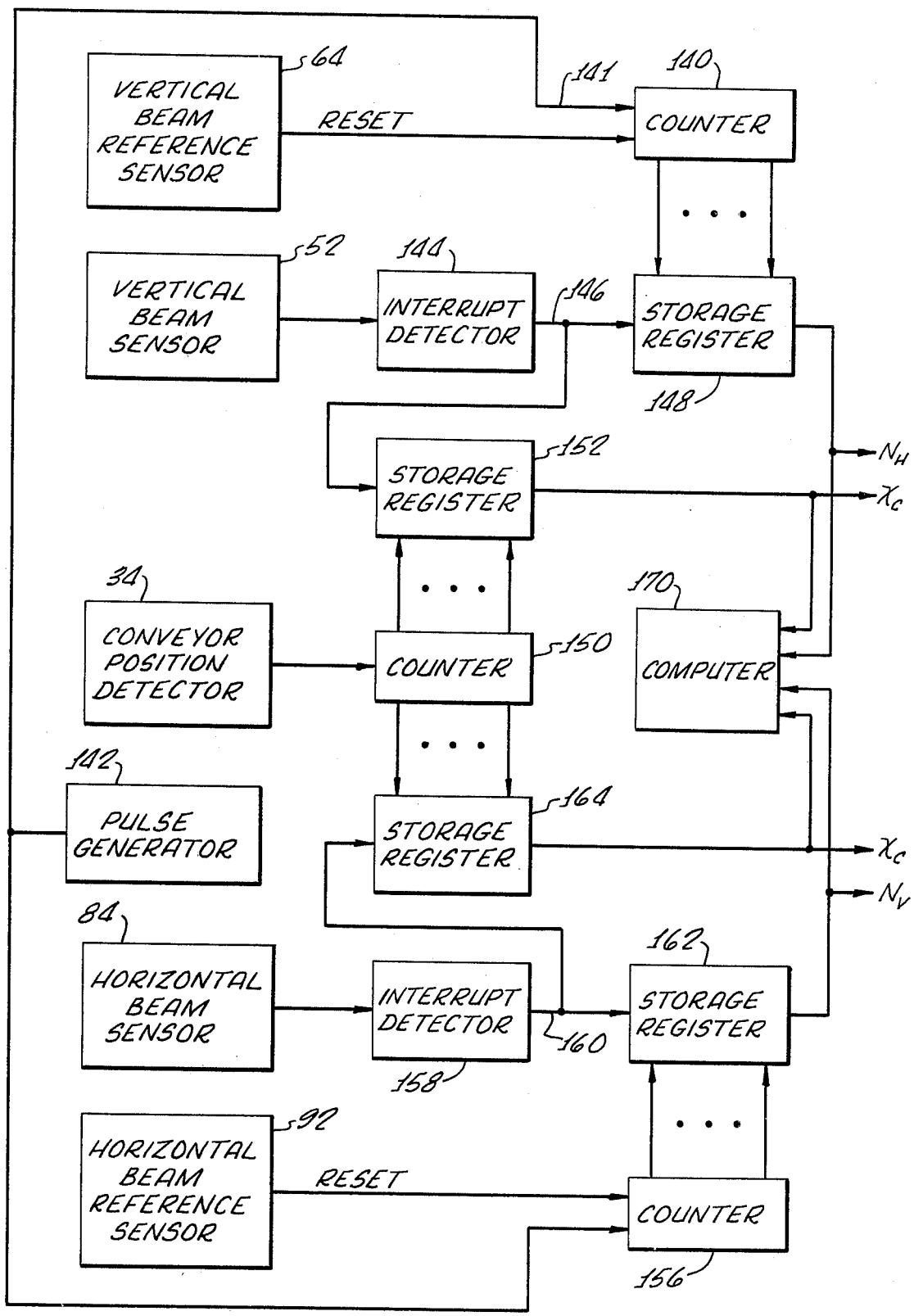
FIG. 7 is a block diagram of electronic components employed to generate signals that collectively define intersection coordinates.

Illustrated in FIG. 7 is an electronic circuit that will generate the electrical signals defining the coordinate pairs of the several intersections. Vertical beam reference sensor 64 generates a single pulse that is sent to reset a counter 140 having a counting input on a line 141 from a pulse generator 142. Pulse generator 142 provides a train of output pulses of fixed repetition rate at a relatively high frequency such as one megahertz for example. Vertical beam sensor 52 produces a signal that is on or off depending upon whether or not the vertical beam is occluded by the interposed pipe. The output signal of the sensor 52 switches from on to off and from off to on as the beam intersects a boundary of the tube. As the beam first meets a tube boundary the output of sensor 52 goes from on to off and as the beam leaves the tube, at its next intersection with the boundary, the sensor output goes from off to on. This on/off signal is fed to an interrupt detector 144 that senses each discontinuity in the on/off and off/on output of the vertical beam sensor and produces a pulse on an output line 146 at each change of the vertical beam sensor output from on to off and from off to on. The signal on line 146 is fed to a storage register 148 to allow transfer of the number drogen is consumed, filtered and the solvent evaporated under reduced pressure to give the title compound.

EXAMPLES 13-30

Following the procedure (without the final salt formation) of Example 1, but substituting the compound listed in column I for 2-(3-dimethylaminopropoxy)benzaldehyde, the compound listed in column II for phenethylamine, and the compound listed in column III for cinnamoyl chloride, yields the compound listed in column IV.

EXAMPLE 31

4-Chloro-N-[[2-[3-(4-morpholinyl)propoxy]phenyl]methyl]-N-(2-phenylethyl)benzamide; methanesulfonate salt (1:1)

A. 2-[3-(4-Morpholinyl)propoxy]benzaldehyde

Salicylaldehyde (17g) is treated first with 6.7g of 50% sodium hydride in 110 ml of dimethylformamide and then with 92 ml of a 2N toluene solution of N-(3-chloropropyl)-morpholine. The mixture is heated at 105°–110° C for 4 hours, cooled and poured into 300 ml of water. The product is extracted three times with ether. The extracts are combined, dried, concentrated on a rotary evaporator and the residue distilled to give 32.3g of product as an oil, boiling point 155°–160° C at 0.1–0.2 mm of Hg.

| | Column I | Column II | Column III | Column IV |
|---|---|---|---|---|
| 13 | 2-(2-diisopropylaminoethoxy)-benzaldehyde | n-butylamine | phenylacetyl chloride | N-butyl-N-[[2-]2-(diisopropylamino)ethoxy]phenyl]methyl]phenylacetamide |
| 14 | 2-[4-(1-pyrrolidinyl)butoxy]-benzaldehyde | n-pentylamine | propionyl chloride | N-pentyl-N-[[2-[4-(1-pyrrolidinyl)butoxy]phenyl]methyl]propionamide |
| 15 | 3-[2-(1-piperidinyl)ethoxy]-benzaldehyde | isopropylamine | benzoyl chloride | N-isopropyl-N-[[3-[2-(1-piperidinyl)ethoxy]phenyl]methyl]benzamide |
| 16 | 2-[5-(4-morpholinyl)pentoxy]-benzaldehyde | 4-chlorophenethylamine | benzoyl chloride | N-[[2-[5-(4-morpholinyl)pentoxy]phenyl]methyl]-N-[2-(4-chlorophenyl)ethyl]-benzamide |
| 17 | 4-[2-(1-piperazinyl)ethoxy]-benzaldehyde | 2-methoxyphenethylamine | benzoyl chloride | N-[[4-[2-(1-piperazinyl)-ethoxy]phenyl]methyl]-N-[2-(2-methoxyphenyl)ethyl]-benzamide |
| 18 | 2-[3-(4-methyl-1-piperazinyl)-propoxy]benzaldehyde | 3-trifluoromethylphenethylamine | benzoyl chloride | N-[[2-[3-(4-methyl-1-piperazinyl)propoxy]phenyl]methyl]-N-[2-(3-trifluoromethylphenyl)ethyl]benzamide |
| 19 | 2-(2-dimethylaminoethoxy)-benzaldehyde | 2-methylphenethylamine | cinnamoyl chloride | N-[[2-(2-dimethylamino)ethoxy]phenyl]methyl]-N-[2-(2-methylphenyl)-ethyl]-3-phenyl-2-propenamide |
| 20 | 2-(3-dimethylaminopropoxy)-benzaldehyde | cyclopropylamine | 3-(4-chlorophenyl)-2-propenoyl chloride | N-cyclopropyl-3-(4-chlorophenyl)-N-[[2-[3-(dimethylamino)propoxy]phenyl]-methyl]-2-propenamide |
| 21 | 2-(2-dimethylaminoethoxy)-benzaldehyde | cyclohexylamine | 3-(2-methylphenyl)-2-propenoyl chloride | N-cyclohexyl-N-[[3-[2-(dimethylamino)ethoxy]phenyl]methyl]-3-(2-methylphenyl)-2-propenamide |
| 22 | 2-(dimethylaminopropoxy)-benzaldehyde | cycloheptylamine | 3-(2-methoxyphenyl-2-propanoyl chloride | N-cycloheptyl-N-[[2-[3-dimethylamino)propoxy]-phenyl]methyl]-3-(2-methoxyphenyl)-2-propenamide |
| 23 | 2-(3-dimethylaminopropoxy)-benzaldehyde | benzylamine | 4-bromobenzoyl chloride | N-benzyl-4-bromo-N-[[2-[3-(dimethylamino)propoxy]phenyl]methyl]benzamide |
| 24 | 2-(3-dimethylaminopropoxy)-benzaldehyde | 2-methylbenzylamine | benzenesulfonyl chloride | N-[[2-[3-(dimethylamino)-propoxy]phenyl]methyl]-N-(2-methylbenzyl)benzenesulfonamide |
| 25 | 2-[4-(1-pyrrolidinyl)butoxy]-benzaldehyde | 3-trifluoromethylbenzylamine | p-toluenesulfonyl-chloride | 4-methyl-N-[[2-[4-(1-pyrrolidinyl)butoxy]-phenyl]methyl]-N-(3-trifluoromethylbenzyl)-benzenesulfonamide |
| 26 | 3-[2-(1-piperidinyl)ethoxy]-benzaldehyde | 2-ethoxybenzylamine | 4-chlorobenzenesulfonyl chloride | 4-chloro-N-(2-ethoxybenzyl)-N-[[3-[2-(1-piperidinyl)-ethoxy]phenyl]methyl]benzenesulfonamide |
| 27 | 2-[3-(4-morpholinyl)propoxy]-benzaldehyde | 4-nitrobenzylamine | 4-nitrobenzenesulfonyl chloride | N-[[2-[3-(4-morpholinyl)-propoxy]phenyl]methyl]-N-(4-nitrobenzyl)-4-nitrobenzenesulfonamide |
| 28 | 2-(3-dimethylaminopropoxy)-benzaldehyde | t-butylamine | cyclohexanoyl chloride | N-(t-butyl)-N-[[2-[3-(dimethylamino)propoxy]phenyl]methyl]-cyclohexanamide |
| 29 | 2-(4-dimethylaminobutoxy)-benzaldehyde | p-toluidine | cycloheptanoyl chloride | N-[[2-[4-(dimethylamino)butoxy]-phenyl]methyl]-N-(4-(methylphenyl)-cycloheptanamide |
| 30 | 2-(2-methylethylaminoethoxy)-benzaldehyde | cyclopropylmethyl-amine | cinnamoyl chloride | N-cyclopropylmethyl-N-[[2-[2-(methylethylamino)ethoxy]phenyl]-methyl]-3-phenyl-2-propenamide |

B.
N-[[2-[3-(4-Morpholinyl)propoxy]phenyl]methylene]-benzeneethanamine

2-[3-(4-Morpholinyl)propoxy]benzaldehyde (31.7g) is reacted with 15.8g of phenethylamine in 130 ml of toluene following the procedure described in Example 1A to yield 34.3g of product as an oil, boiling point 215°–219° C at 0.2–0.3 mm of Hg.

C.
N-[[2-[3-(4-Morpholinyl)propoxy]phenyl]methyl]-benzeneethanamine

N-[[2-[3-(4-Morpholinyl)propoxy]phenyl]methylene]-benzeneethanamine (17g) is reduced with 5.4g of sodium borohydride in 85 ml of methanol following the procedure described in Example 1B to yield 12.8g of product as an oil, boiling point 219°–223° C at 0.1–0.2 mm of Hg.

D.
4-Chloro-N-[[2-[3-(4-morpholinyl)propoxy]phenyl]methyl]-N-(2-phenylethyl)benzamide, methanesulfonate salt (1:1)

N-[[2-[3-(4-Morpholinyl)propoxy]phenyl]methyl]-benzeneethanamine (12.7g) and 6.5g of p-chlorobenzoyl chloride are reacted in 180 ml of chloroform following the procedure described in Example 1C. The glass-like residue from the chloroform evaporation is rubbed under ether and the evaporation repeated to give 19.3g of a foamy residue. The residue is taken up in 70 ml of acetonitrile and diluted to 400 ml with ether. On seeding and rubbing, 16.8g of the crystalline hydrochloride salt separates, melting point 156°–158° C (sintering at 145° C). Following recrystallization from 60 ml of warm methanol-500 ml ether, the solid weighs 15.4g, melting point 156°–158° C (sintering at 147° C).

The hydrochloride salt is only slightly soluble in water. A portion of it is converted to the more soluble mesylate salt. Eight grams of the hydrochloride salt yields 7.4g of the oily base. The base and 1.5g of methanesulfonic acid are dissolved in 45 ml of acetonitrile and diluted to 225 ml with ether. On seeding and rubbing the title compound separates, yielding (after about 16 hours cooling) 8.1g of product, melting point 171°–173° C (sintering at 125° C). Recrystallization from 25 ml of warm acetonitrile-75 ml ether yields 7.7g of product, melting point 173°–175° C (sintering at 128° C).

EXAMPLE 32
N-[[2-[3-(4-Morpholinyl)propoxy]phenyl]methyl]-3-phenyl]N-(2-phenylethyl)-2-propenamide, hydrochloride (1:1)

N-[[2-[3-(4-Morpholinyl)propoxy]phenyl]methyl]-benzeneethanamine (19 g, see Example 31C) and 9.0 g of cinnamoyl chloride are reacted in 260 ml of chloroform as described in Example 9. The residue from the chloroform evaporation (after rubbing under ether and repeating the evaporation) is dissolved in 100 ml of acetonitrile, diluted to 400 ml with ether and maintained at a reduced temperature; the crystalline hydrochloride salt slowly separates. After 4 days at reduced temperature, the material is filtered, washed with ether and dried in vacuo to yield 22.7g of material, melting point 112°–114° C (sintering at 105° C). Following crystallization from 60 ml of warm acetonitrile-240 ml ether, the product weighs 21.5 g and has a melting point of 142°–144° C.

EXAMPLE 33
4-Chloro-N-[[2-[2-(4-morpholinyl)ethoxy]phenyl]methyl]-N-(2-phenylethyl)benzamide, hydrochloride salt (1:1)

A. 2-[2-(4-Morpholinyl)ethoxy]benzaldehyde

Salicylaldehyde (34 g) is treated first with 13.4 g of 50% sodium hydride in 220 ml of dimethylformamide and then with 185 ml of a 2N toluene solution of N-(2-chloroethyl)morpholine. The mixture is heated at 105°–110° C for 4 hours, cooled and poured into 300 ml of water. The product is extracted three times with ether. The extracts are combined, dried, concentrated on a rotary evaporator and the residue distilled to give 56.6 g of product as an oil, boiling point 145°–150° C at 0.05–0.1 mm of Hg.

B.
N-[[2-[2-(4-Morpholinyl)ethoxy]phenyl]methylene]-benzeneethanamine

2-[2-(4-Morpholinyl)ethoxy]benzaldehyde (55.9 g) is reacted with 29 g of phenethylamine in 240 ml of toluene following the procedure described in Example 1A to yield 68.8 g of product as an oil, boiling point 204°–210° C at 0.1–0.2 mm of Hg.

C.
N-[[2-[2-(4Morpholinyl)ethoxy]phenyl]methyl]benzeneethanamine

N-[[2-[2-(4-Morpholinyl)ethoxy]phenyl]methylene]-benzeneethanamine (68.5 g) is reduced with 22.5 g of sodium borohydride in 350 ml of methanol following the procedure described in Example 1B to yield 54 g of product as an oil, boiling point 216°–220° C at 0.2–0.3 mm of Hg.

D.
4-Chloro-N-[[2-[2-(4-morpholinyl)ethoxy]phenyl]methyl]-N-(2-phenylethyl)benzamide, monohydrochloride, hemihydrate N-[[2-[2-(4-Morpholinyl)ethoxy]phenyl]methyl]benzeneethanamine (40 g) and 22 g of p-chlorobenzoyl chloride are reacted in 600 ml of chloroform following the procedure described in Example 1C. The residue from the chloroform evaporation is first triturated with ether (evaporation repeated) and then with 400 ml of warm acetone to give a crystalline product. After diluting with 500 ml of ether and cooling for about 16 hours, the solid is filtered under nitrogen, washed with ether and dried in vacuo to yield 54.7 g of material, melting point 147°–149° C (sintering at 145° C). Crystallization from 250 ml of warm methanol-1750 ml ether yield 52.9 g of the title compound, melting point 147°–149° C.

EXAMPLE 34
4-Chloro-N-[[2-[3-(4-morpholinyl)propoxy]phenyl]methyl]-N-(2-phenylethyl)benzenesulfonamide, hydrochloride (1:1)

N-[[2-[3-(4-Morpholinyl)propoxy]phenyl]methyl]-benzeneethanamine (14g, see Example 31C) is reacted with 9.2 g of p-chlorobenzenesulfonyl chloride in 130 ml of chloroform. A solution of the amine in chloroform is added dropwise at 10°–15° C to a stirred solution of the p-chlorobenzenesulfonyl chloride in chloroform.

concomitantly, the output of position detector 248 is provided for use in the computation in the same manner as is the signal $x_C$ previously described.

When the scanner has completed one full pass along the length of the tube, motor 316 is energized to rotate the tube support and the tube through 90°, whereupon the scanner may commence a second scan which is now in a plane orthogonal to the plane of the first scan (relative to the tube). The scanner frame now moves upwardly under control of motor 228, which has been reversed in direction, and data for the second orthogonal scan is generated.

It will be readily appreciated that other arrangements for holding the tube being scanned in one of two mutually orthogonal positions and rotating it around an axis substantially parallel to the direction of reciprocal travel of the scanner support may be readily devised. Thus the tube may be held by opposed pressure against its two opposite ends or other arrangements may be employed to position the tube at one or both of its ends. Further, the arrangement of FIG. 8 may be employed in a horizontal position and a second pair of scanning discs may be mounted on the scanner support so that no relative turning of the tube is necessary and a complete set of data on the tube profile can be obtained in a single pass. In such an arrangement the tube can be supported by pressing it at both of its ends or a fixedly positioned transparent platform may be employed to support the now horizontally positioned tube.

There have been described methods and apparatus for defining three dimensional configurations of objects that are merely passed through a scanning region without specific orientation or position and without physical contact with the object.

The foregoing detailed description is to be clearly understood as given by way of illustration and example only, the spirit and scope of this invention being limited solely by the appended claims.

What is claimed is:

1. The method of scanning the profile of an object comprising:
   moving a scanning beam across the object in a scan pattern,
   relatively moving said object and pattern, and generating signals collectively defining intersections of said beam scan pattern with a boundary of said object.

2. The method of claim 1 wherein said step of generating signals comprises generating a first signal representing a point on said scan pattern at which the beam intersects a boundary of said object, and generating a second signal representing the position of said pattern with respect to said object.

3. The method of claim 1 wherein said step of moving a scanning beam comprises rotating a scanning beam and reflecting it in a plurality of paths that define said scan pattern.

4. The method of scanning the profile of an object comprising:
   moving a scanning beam across the object in a scan pattern,
   relatively moving said object and pattern,
   generating signals collectively defining intersections of said beam scan pattern with a boundary of said object,
   said scan pattern being circular, said step of generating signals comprising generating a first signal representing distance along said pattern between a reference point and an intersection of said beam with a boundary of said object, and generating a second signal representing distance between a point fixedly related to said pattern and said object.

5. The method of scanning the profile of an object comprising:
   moving a scanning beam across the object in a scan pattern,
   relatively moving said object and pattern, generating signals collectively defining intersections of said beam scan pattern with a boundary of said object,
   turning said object relative to said beam,
   moving said beam across said object in a second scan pattern,
   relatively moving said object and said second scan pattern, and
   generating signals collectively defining intersections of said second beam scan pattern with a boundary of said object.

6. The method of scanning the profile of an object comprising:
   moving a scanning beam across the object in a scan pattern,
   relatively moving said object and pattern,
   generating signals collectively defining intersections of said beam scan pattern with a boundary of said object,
   moving a second scanning beam across the object in a second scan pattern, projecting said second beam in a direction that is angulated with respect to the direction of projection of said first mentioned scanning beam and the direction of relative motion of said object and said first mentioned pattern,
   relatively moving said object and said second pattern, and
   generating signals collectively defining intersections of said second beam scan pattern with a boundary of said object.

7. The method of claim 6 wherein said step of generating signals comprises generating a first set of signals defining a first pair of coordinates of an intersection of said first mentioned beam with said boundary, and generating a second set of signals defining a second pair of coordinates of an intersection of said second beam with said boundary.

8. The method of claim 6 wherein said first and second patterns have circular sections and are fixedly related to one another.

9. The method of scanning the profile of an object comprising:
   moving a scanning beam across the object in a scan pattern,
   relatively moving said object and pattern,
   generating signals collectively defining intersections of said beam scan pattern with a boundary of said object, said scanning being,
   a light beam and said scan pattern having a circular section.

10. The method of scanning the profile of an object comprising:
    moving a scanning beam across the object in a scan pattern,
    relatively moving said object and pattern, generating signals collectively defining intersections of said beam scan pattern with a boundary of said object,
    said step of generating signals comprising generating a train of fixed repetition rate repulses, initiating a count of said pulses at a reference point in said scan pattern, and reading out the count of said pulses upon intersection of said beam with said boundary.

11. The method of claim 10 wherein said scan pattern is a circular cylinder and including the step of determining a coordinate of said intersection of said pattern and beam in accordance with the equation $$x_1 = x_{Cl} - R \sin [(N_H - K_1) K_2]$$

where $x_1$ is distance of said point of intersection along one axis of a coordinate system fixed with respect to said object, $x_{Cl}$ is distance measured along said axis between points fixedly related to said pattern and to said object, R is the radius of said pattern, $N_H$ is the number of pulses counted when said beam intersects said boundary, $K_1$ is a fixed number of pulses angularly relating said reference point to said coordinate system, and $K_2$ is a constant relating the number of pulses to distance traveled by said beam in said pattern.

12. The method of claim 11 including the step of determining a second coordinate of said intersection of said pattern and boundary in accordance with the equation $$y_2 = R [1 - \cos (N_H - K_1) K_2]$$

13. The method of claim 12 including moving a second scanning beam across the object in a second scan pattern and projecting said second beam in a direction transverse to the direction of projection of said first mentioned scanning beam and transverse to the direction of relative motion of said object and said first mentioned pattern, maintaining said first mentioned pattern in fixed relation to said second pattern, and generating signals collectively defining intersection of said second beam scanning pattern with said boundary.

14. The method of claim 13 wherein said last mentioned step of generating signals comprises generating a train of pulses of fixed repetition rate, initiating a count of said last mentioned pulses at a reference point in said second scan pattern, reading out the count of said last mentioned pulses upon intersection of said second beam with said boundary, and defining a third coordinate of the intersection of said second beam and said boundary in accordance with the equation $$z_1 = R_V [1 - \cos (N_V - K_3) K_4]$$

where $R_V$ is the radius of said second pattern, $N_V$ is the number of pulses counted when said second beam intersects said boundary, $K_3$ is a fixed number of pulses angularly relating said reference point of said second pattern to said coordinate system, and $K_4$ is a constant relating the number of pulses to distance traveled by said second beam in said second pattern.

15. The method of claim 14 including repeatedly generating signals that collectively define intersections of said beam scan pattern with said boundary as said object moves relative to said patterns, and repeatedly defining intersection coordinates, $x_1, y_1, z_1$ in accordance with the respective equations of these coordinates.

16. The method of three dimensional profile scanning of an object comprising:
projecting a beam of light parallel to a first axis in a first circular scan pattern,
projecting a beam of light parallel to a second axis in a second circular scan pattern,
said second axis being angulated with respect to said first axis,
moving said object relative to both said first and second scan patterns along a third axis angulated with respect to said first and second axes, and
generating signals collectively defining intersections of said beam scan patterns with a boundary of said object to thereby define points on the boundary of projections of said object upon first and second planes respectively transverse to said first and second axes.

17. The method claim 16 wherein different beam projectors are used to project said beams.

18. The method of claim 16 wherein said beams are projected at different times.

19. The method of three dimensional profile scanning of an object comprising:
projecting a beam of light parallel to a first axis in a first scan pattern,
projecting a beam of light parallel to a second axis in a second scan pattern,
said second axis being angulated with respect to said first axis,
moving said object relative to both said first and second scan patterns along a third axis angulated with respect to said first and second axes, and
generating signals collectively defining intersections of said beam scan patterns with a boundary of said object to thereby define points on the boundary of projections of said object upon first and second planes respectively transverse to said first and second axes, said beams being projected by a common beam projector.

20. The method of three dimensional profile scanning of an object comprising:
projecting a beam of light parallel to a first axis in a first scan pattern,
projecting a beam of light parallel to a second axis in a second scan pattern,
said second axis being angulated with respect to said first axis,
moving said object relative to both said first and second scan patterns along a third axis angulated with respect to said first and second axes,
generating signals collectively defining intersections of said beam scan patterns with a boundary of said object to thereby define points on the boundary of projections of said object upon first and second planes respectively transverse to said first and second axes, said beams being projected by a common beam projector at different times, and
turning said object relative to said first mentioned beam about an axis extending in the direction of said third axis.

21. The method of three dimensional profile scanning of an object comprising:
projecting a beam of light parallel to a first axis in a first scan pattern,
projecting a beam of light parallel to a second axis in a second scan pattern,
said second axis being angulated with respect to said first axis,
moving said object relative to both said first and second scan patterns along a third axis angulated with respect to said first and second axes,
generating signals collectively defining intersections of said beam scan patterns with a boundary of said object to thereby define points on the boundary of projections of said object upon first and second planes respectively transverse to said first and second axes, said first and second patterns being circular cylinders, said step of generating signals comprising generating a first signal representing the angle included between a radius of said first pattern to a reference point and a radius of said first pattern to an intersection thereof with a boundary of said object, and generating a second signal representing the distance between points fixedly related to said first scan pattern and to said object respectively.

22. Profile scanning apparatus comprising:
carrier means for supporting an object of which the profile is to be scanned,
a scanning device comprising means for generating an energy beam moving in a scan pattern across an object supported by said carrier means, said object being opaque to said beam,
means for effecting relative motion of said carrier means and said scanning device to thereby move said scan pattern over said object,
means for generating a first signal representing position of said carrier means with respect to said scanning device, and
means responsive to occlusion of said beam by said object for generating a second signal representing an intersection of said energy beam with a boundary of said object.

23. The apparatus of claim 22 wherein said carrier means is transparent to said energy beam.

24. The apparatus of claim 22 wherein said carrier means includes means for supporting said object from an end of said object.

25. The apparatus of claim 22 wherein said carrier means comprises means for suspending said object.

26. The apparatus of claim 22 wherein said carrier means contacts said object only at an interior surface of said object.

27. The apparatus of claim 22 wherein said object is connected with said carrier means at at least one of the ends of said object and is free of connection with said carrier means between said ends.

28. The apparatus of claim 22 including means for relatively turning said carrier means and object about an axis extending in the direction of said relative motion.

29. The apparatus of claim 22 including a second scanning device having means for generating a second energy beam that is angulated with respect to said first mentioned energy beam and that moves in a second scan pattern across said object,
means for effecting relative motion of said carrier means and said second scanning device,
means for generating a third signal representing position of said carrier means with rspect to said second scanning device, and
means for generating a fourth signal representing intersection of said second energy beam with a boundary of said object.

30. The apparatus of claim 29 wherein said first and second scanning devices are fixedly connected to one another and said first and second scan patterns are fixedly positioned relative to one another.

31. The apparatus of claim 29 including a support, said carrier means comprising a platform mounted for motion along said support, said first and second scanning devices being fixedly mounted to said support and mutually angulated to project said first and second energy beams, respectively, in a first direction parallel to a surface of said platform and in a second direction normal to a surface of said platform.

32. The apparatus of claim 31 wherein said means for generating said first and third signals comprises position detector means for generating signals indicative of position of said platform relative to said support.

33. The apparatus of claim 31 wherein said platform is transparent to said energy beams.

34. The method of claim 22 wherein said scanning device comprises a beam generator for projecting said energy beam along a path, and a rotating reflector in said path for directing said beam in a plurality of different paths to define said scan pattern.

35. Apparatus for three dimensional profile scanning of an object comprising
means for projecting a first scanning beam parallel to a first axis,
means for moving said beam across the object in a first scan pattern,
means for projecting a second scanning beam parallel to a second axis that is angularly related to said first axis,
means for moving said second beam across the object in a second scan pattern,
means for moving the object relative to said scan patterns, and
means for defining intersections of said beams with a boundary of said object, said last mentioned means comprising,
means for generating a first set of signals defining first and second coordinates of an intersection of said first beam with said boundary, and
means for generating a second set of signals defining first and second coordinates of an intersection of said second beam with said boundary.

36. The apparatus of claim 35 wherein said first and second set of signals define said coordinates in respective ones of two mutually angulated planes.

37. Scanning apparatus for measuring profile of an object comprising
a scanner support,
an object support,
means for moving said object support relative to said scanner support along a first axis,
first scanning means mounted to said scanner support for generating an energy beam that is projected in a circular cylindrical scanning pattern having a second axis perpendicualar to said first axis,
first detector means for sensing intersection of said beam with a boundary of said object,
means for generation a train of pulses,
first counter means for counting said pulses,
second detector means for sensing a reference position of said beam in said scan pattern and resetting said first counter means,
means responsive to said first detector means for reading from said first counter a number corresponding to position of a intersection of said beam and said boundary,
position detector means for sensing position of said scanner support with respect to said object support, and means responsive to said position detector means for generating a signal representing the position of said scanner support relative to said object.

38. The apparatus of claim 37 including a second scanning means mounted to said scanner support for generating a second energy beam that is projected in a circular cylindrical scanning pattern having a third axis orthogonal to both said first and second axes, third detector means for sensing intersection of said second beam with a boundary of said object, second counter means for counting said pulses, fourth detector means for sensing a reference position of said second beam in said second scan pattern and resetting said second counter means, and means responsive to said third detector means for reading from said second counter means a number corresponding to position of an intersection of said second beam and said boundary.

39. The apparatus of claim 38 wherein said scanner support comprises a scanner support frame and wherein said object support comprises a platform mounted for motion along said frame.

40. The apparatus of claim 39 wherein said first mentioned scanning means comprises a scanning beam generator mounted to said frame above said platform, said scanning beam generator comprising a first disc journalled on said scanner support frame on one side of said platform, means for rotating said disc, reflector means mounted on said disc for displacing a light beam received along the disc axis to a path parallel to the disc axis and adjacent the disc periphery, a light source mounted to said frame for projecting a light beam along the disc axis to said reflector means, a second disc on said scanner support frame on the other side of said platform, said second disc being mounted to said frame for rotation about an axis coincident with the axis of said first disc, means for rotating said second disc in synchronism with rotation of said first disc, second reflector means carried by said second disc for displacing a light beam received adjacent the periphery thereof to and along the axis of the disc, detector means for receiving a light beam from said light source and reflected by reflector means on both said discs, reference detector means mounted to said frame between said first and second discs for receiving a light beam reflected from said first disc at a predetermined point in the disc rotation, and means for detecting motion of said platform with respect to said scanner support frame, said platform being transparent.

41. Profile scanning apparatus comprising
a frame,
a scanner support mounted to said frame for movement along the frame,
drive means for driving the scanner support along the frame,
scanning means carried by said scanner support for generating an energy beam moving in a scan pattern across an object in the path of said beam,
an object support mounted to said frame, and
means for turning said object support about an axis extending in the direction of motion of said scanner support along said frame.

42. The apparatus of claim 41 wherein said scanning means comprises a first disc journalled on said scanner support on one side of said frame, means for rotating said disc, reflector means mounted on said disc for displacing a light beam received along the disc axis to a path parallel to the disc axis and adjacent the disc periphery, a light source mounted to said scanner support for projecting a light beam along a disc axis to said reflector means, a second disc mounted on said scanner support on the other side of said frame, said second disc being mounted to said scanner support for rotation about an axis coincident with the axis of said first disc, means for rotating said second disc in synchronism with rotation of said first disc, second reflector means carried by said second disc for displacing a light beam received adjacent the periphery thereof to and along the axis of the disc, detector means for receiving a light beam from said light source and reflected by reflector means on both said discs, reference detector means mounted to said frame between said first and second discs for receiving a light beam reflected from said first disc at a predetermined point in the disc rotation, and means for detecting motion of said scanner support with respect to said frame.

43. The apparatus of claim 41 wherein said object support comprises a support body having a conical recess, a split ball collet having a tapered outer surface seated in said conical recess and having an inner spherical recess, a support rod having a tube engaging chuck at one end thereof and a ball at the other end thereof, said ball being received within said spherical recess of said split collet, and actuating cable means secured to said tube engaging chuck and extending through said support rod, through said ball, through said split collet and through said support body for simultaneously actuating the tube support chuck and urging said split collet into said conical recess to lock said ball within said spherical recess.

44. A tube support comprising
a support body having a conical recess,
a split ball collet having a tapered outer surface seated in said conical recess and having an inner spherical recess,
a support rod having a tube engaging chuck at one end thereof and a ball at the other end thereof, said ball being received within said spherical recess of said split collet, and
actuating cable means secured to said tube engaging chuck and extending through said support rod, through said ball, through said split collet and through said support body for simultaneously actuating the tube support chuck and urging said split collet into said conical recess to lock said ball within said spherical recess.

45. The tube support of claim 44 wherein said chuck comprises a split chuck collet adapted to be inserted into an end of a tube to be grasped by the chuck, said split chuck collet having a tapered recess therein, a tapered plug seated in said tapered recess of said chuck collet, one end of said cable means being anchored in said tapered plug, and spring means interposed between an end of said rod and said plug for urging said plug from said tapered recess of said split chuck collet.

46. The apparatus of claim 45 including means for pivotally mounting said ball to said split ball collet.

47. The apparatus of claim 46 including a support housing, means for rotatably mounting said support body to said support housing, and means for rotatably driving said support body relative to said support housing.

48. Profile scanning apparatus comprising:
carrier means for supporting an object of which the profile is to be scanned,
a scanning device comprising
means for generating and projecting an energy beam along a path,
reflector means rotatably mounted in said path for reflecting said beam along a plurality of different paths in a scan pattern that crosses an object supported by said carrier means, means for rotating said reflector means, means for effecting relative motion of said carrier means and said scanning device to thereby move said scan pattern over said object, means for generating a first signal representing position of said carrier means with respect to said scanning device, and means for generating a second signal representing an intersection of said energy beam with a boundary of said object.

* * * * *

UNITED STATES PATENT AND TRADEMARK OFFICE
CERTIFICATE OF CORRECTION

PATENT NO. : 4,122,525

DATED : October 24, 1978

INVENTOR(S) : Homer J. Eaton

It is certified that error appears in the above—identified patent and that said Letters Patent are hereby corrected as shown below:

Columns 9 thru 12 should be deleted to insert the attached Columns 9 thru 12 therefor.

THIS CORRECTION APPLYS TO THE GRANT, EXCLUSIVELY.

Signed and Sealed this

Nineteenth Day of June 1979

[SEAL]

Attest:

RUTH C. MASON
Attesting Officer

DONALD W. BANNER
Commissioner of Patents and Trademarks stored in counter 140 into the storage register. Thus, the latter will store and hold the value in the counter at the time of intersection of the scanning beam with the tube boundary. The output of storage register 148 is an electrical representation of the quantity $N_H$ of equations (3) and (4) and thus represents the number of pulses provided by pulse generator 142 between the time that the vertical beam passed the reference sensor 64 and the time of its intersection with a tube boundary.

Conveyor position detector or incremental encoder 34 produces an output comprising a series of pulses which are chronologically spaced from one another by fixed intervals, each representing an equal increment of motion of the conveyor and tube in the travel past the scanners. The pulse output of the detector 34 is fed to a second counter 150 and thence to a second storage register 152 which, like register 148, is enabled by the interrupter detector output pulse on line 146. Thus, storage register 152 will store the number that is contained in counter 150 at the time that the vertically directed beam intersects the tube boundary. The output of storage register 158 is thus that X axis quantity $x_C$ which occurs with the particular value of $N_H$ that is generated at the same time.

For the horizontally directed beam similar circuitry is employed so that the horizontal beam reference sensor 92 produces a signal that is fed to reset a third counter 156 which receives at its counting input the fixed repetition rate pulses generated by pulse generator 142. The horizontal beam sensor or photo-cell 84 produces an on/off signal similar to that produced by vertical sensor 52 and this signal is fed to an interrupt detector 158, identical to interrupt detector 144, which produces on an output line 160, a pulse for each change of the output of sensor 84 from on to off and from off to on. Each pulse on line 160 is fed to a storage register 162 to enable the latter to store the number contained in counter 156 at the time of occurrence of a particular intersection of the horizontally directed beam with a boundary of the tube. The output of storage register 162 is the quantity of $N_V$ of equations (7) and (8) and represents the number of pulses provided by the pulse generator between the time that the beam passes the reference point and the time of intersection of the beam and tube boundary.

To obtain the second coordinate of the pair of coordinates that defines an intersection on the vertial projection of the tube, the output of conveyor position detector counter 150 is fed to another storage register 164 which is enabled by the output on line 160 of horizontal beam sensor interrupt detector 158. The storage register 164 receives and stores the number in the counter 150 at the time of the particular intersection of the horizontal beam and tube boundary. Thus, the output of storage register 164 is that X axis dimension $x_C$ which occurs with the particular value of $N_V$ that is generated at the same time. The $x_C$ outputs of registers 152, 164 represent the position of the conveyor (and tube) with respect to the scanners (and scan patterns).

Thus, it will be seen that the described circuit generates pairs of electrical signals, $x_C$, $N_H$ and $x_C$, $N_V$. The signals of one pair define a point on one orthographic projection of the tube and the signals of the other pair define a point on another orthographic projection of the tube. It will be understood that the intersection of which $x$ and $y$ coordinates are defined by $N_H$ and $x_C$ from the storage registers 148 and 152, respectively, is not the same as the intersection of which the $x$ and $z$ coordinates are defined by $x_C$ and $N_V$ from storage registers 164 and 162, respectively.

Given $x$, $y$ coordinates of the projection of the tube on a horizontal plane, the center line of this projection may be readily obtained. Similarly, given $x$, $z$ coordinates of the $x$, $z$ projection of the tube on a vertical plane, the center line of this projection may be obtained. Having defined the center lines of two mutually orthogonal projections the three dimensional center line of the actual tube may be obtained. From the three dimensional center lines can be computed the desired tube data including the length of the straights, the angle of bend, bend radius and the plane of bend. This can be done by graphical, analog or digital analysis and computation. Preferably a suitably programmed digital computer 170 will receive the outputs of the several storage registers and directly print out the data for each scanned tube, or merely compare such data with a reference and indicate acceptability of the tube.

As previously mentioned, the slats of the conveyor are transparent to enable the scanning beams to reach the target disc and target photo-cell. The slats are flexibly interconnected and, as presently preferred, are from 6 to 8 inches wide with one-eighth inch spacing between adjacent slats. Length of the slats (and width of the conveyor) is just less than the distance between discs 78 and 86. This is determined by the size of the objects to be measured and may be in the order of 3 to 5 feet, for example. Changes in light transmission at slat edges (due to such effects as diffraction) are small enough to be tolerated in some applications. To minimize such errors, the gap between slats is kept quite small. Positions of the gaps are known in the measuring coordinate system and thus measurements at the gaps may be inhibited or discarded (without significant compromise of accuracy) to eliminate effects of diffracton.

The problem of diffraction may also be eliminated by use of a solid, one piece transparent platform, instead of the conveyor, to support the tube. Such platform would reciprocate along the frame 10, moving from one end to the other and carrying a tube through the scanning region. The tube is then removed and the one piece platform is returned to the starting end to receive another tube to be measured.

MODIFICATION

Figure 8:
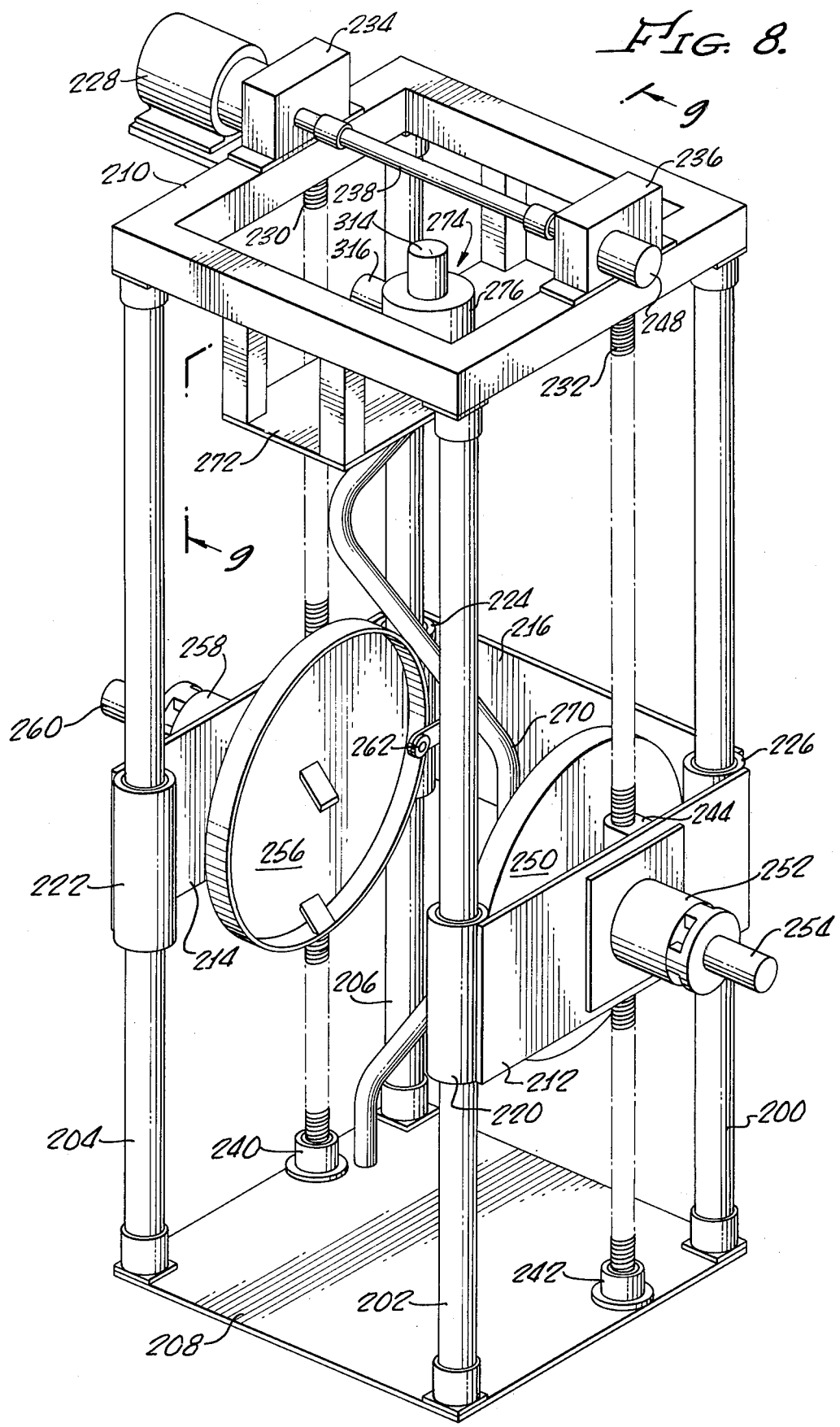
FIG. 8 is a perspective view of a modified scanning apparatus.

Illustrated in FIG. 8 is a modification of the invention employing only a single scanner movable along a framework that supports the object being scanned without any conveyor or platform. In this arrangement, the object is turned through 90° after a first scan has been completed in order to provide a second orthogonal scan.

As shown in FIG. 8, an upstanding frame comprises fixed corner posts 200, 202, 204 and 206, fixedly connected to each other in a substantially rectangular array by means of a bottom plate 208 and a rigid upper rectangular frame 210. Slidably mounted upon the standards 200, 202, 204 and 206 is a substantially U-shaped scanner support comprising first and second rigid side plates 212, 214 and a back plate 216. The scanner support plates are fixedly connected to each other by means of their rigid connections to a plurality of slidable bearing collars 220, 222, 224 and 226. The bearing collars are a snug but sliding fit upon the standards and thus the entire scanner support may be readily moved up and down along the standards.

To reciprocally drive the scanner support along the posts, there is provided a fixedly mounted reversible motor 228 that simultaneously drives a pair of vertically extending threaded shafts 230, 232 by means of first and second gear boxes 234, 236 interconnected via a coupling shaft 238. Threaded shafts 230 are journalled at their lower ends in bearings 240, 242 mounted upon plate 208. The shafts are threaded in internally threaded apertures of a lug 244 fixedly mounted to and projecting inwardly from side plate 212 and a similar lug (not seen in FIG. 8) fixedly mounted to and projecting inwardly from side plate 214. An encoder or scanner support position detector 248 is mounted to detect motion of one of the shafts, such as shaft 238, for example, and may be the same as encoder or conveyor position detector 34 described in the embodiments of FIGS. 1–4. Encoder 248 provides an output signal that defines the position of the scanner support in its slidable travel along the vertical posts.

Figure 3:
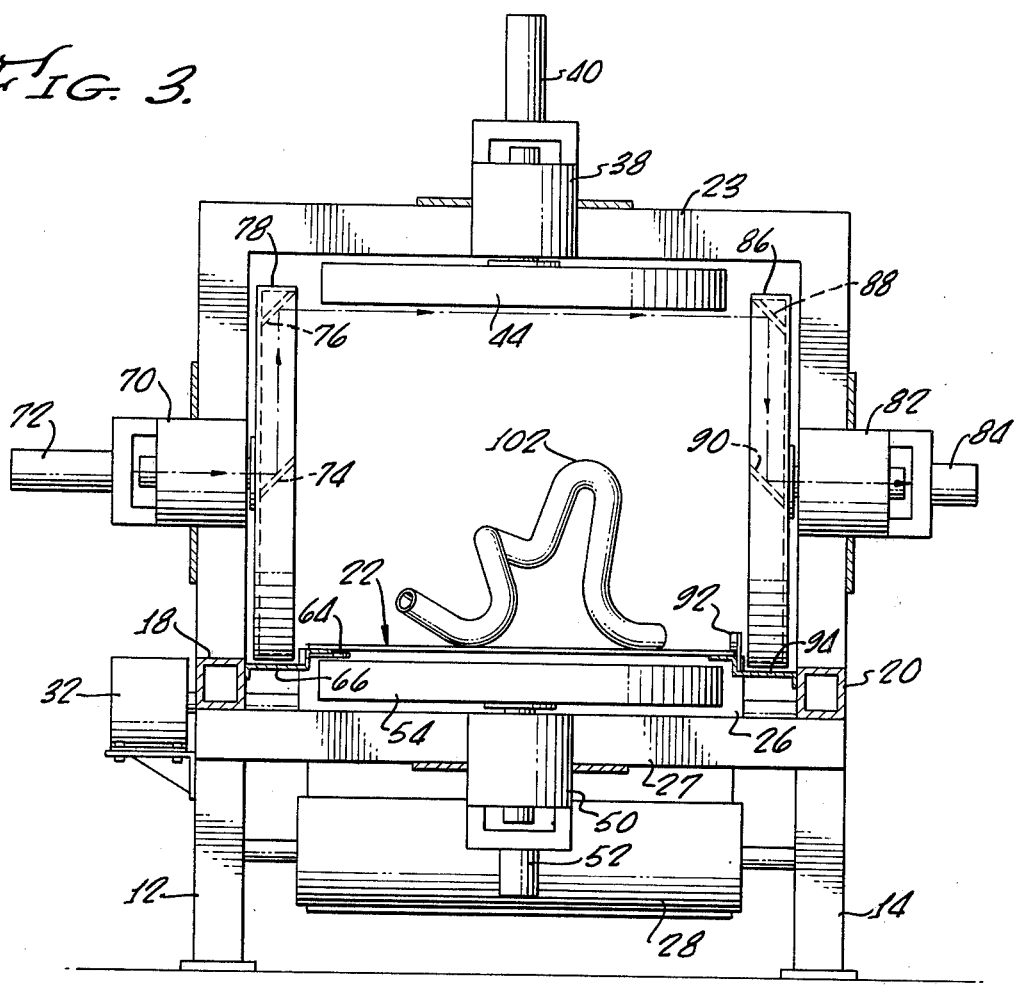
FIG. 3 is an end view of the apparatus of FIG. 1.
Figure 4:
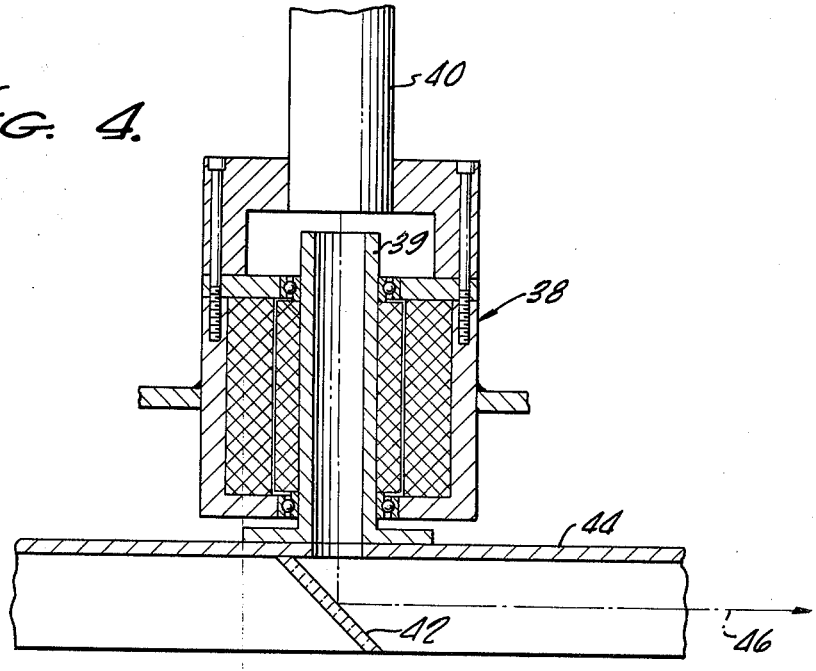
FIG. 4 is a sectional view, on a larger scale, of a motor and part of a disc driven thereby.

Mounted on the scanner support side plate 212 are a first disc 250, a motor 252 and a laser 254, all of which are identical to corresponding components 78, 70 and 72, respectively, of FIGS. 1 and 3. Mounted upon the side plate 214 are a second disc 256, a second motor 258 and a laser target or detector 260, all of which are respectively identical in construction, relation and operation to the corresponding components identified as disc 86, motor 82 and detector 84 of FIGS. 1–3. The pair of scanning discs, their motors, the laser 254 and detector 260, all operate in the same manner as do the corresponding components forming one of the two mutually orthogonal scanners of FIGS. 1–3. A fixed target 262 is mounted on the scanner support to provide a reference sensor for the scanning beam of the scanner.

Since the scanner in the embodiment of FIG. 8, rather than the object being scanned, is reciprocally movable along the frame, the object need not be mounted for motion across the scan pattern of the scan generator. However, since in this embodiment only a single scanner is provided, it is necessary either to rotate the scanner around an axis extending along the direction of travel of the scan pattern (up and down in the embodiment of FIG. 8) or to rotate the object itself about such axis. This relative rotation allows the single scanner to scan first in one direction and then to scan in a second orthogonal direction relative to the object.

Figure 9:
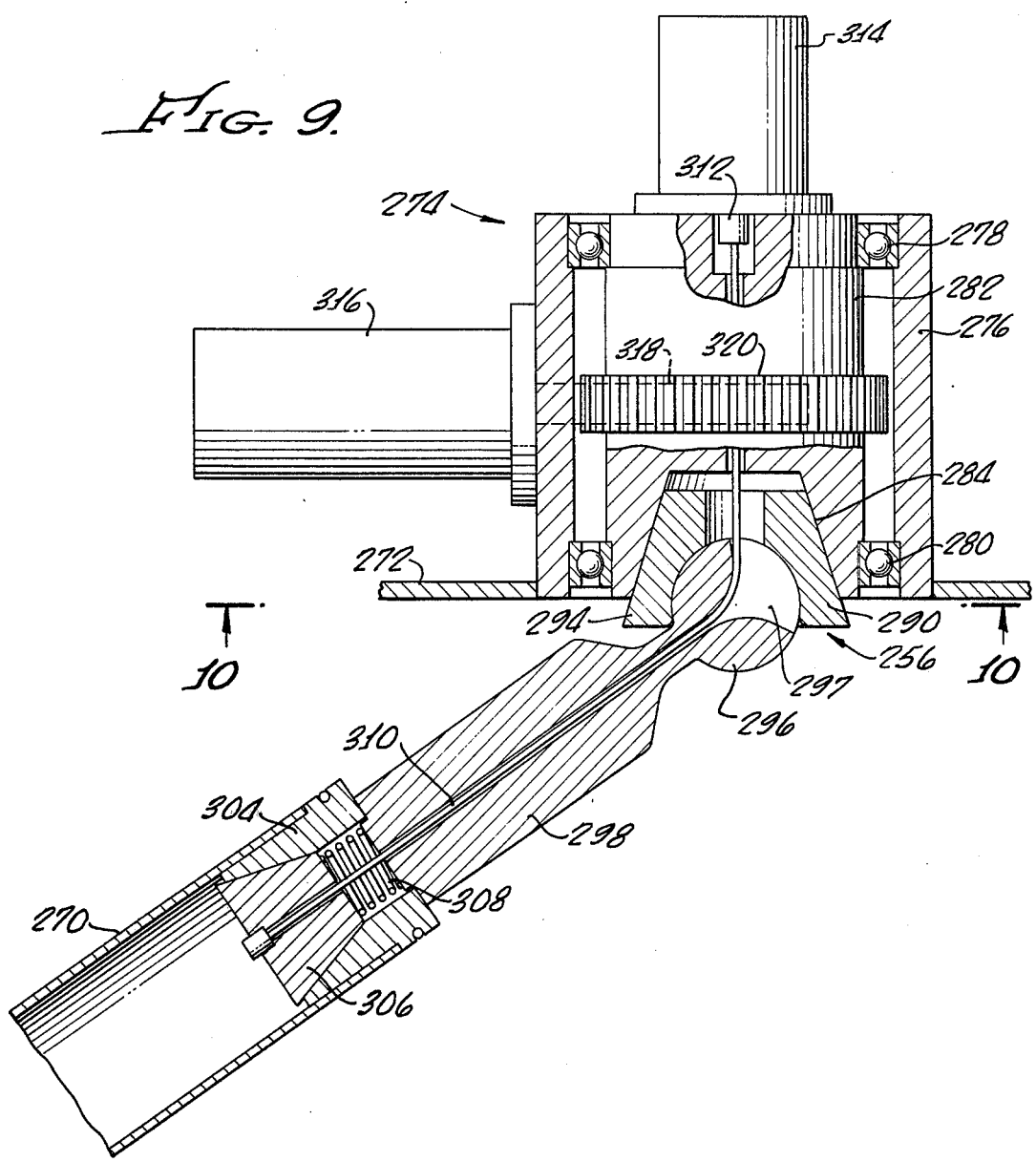
FIG. 9 is a section taken on lines 9—9 of FIG. 8.
Figure 10:
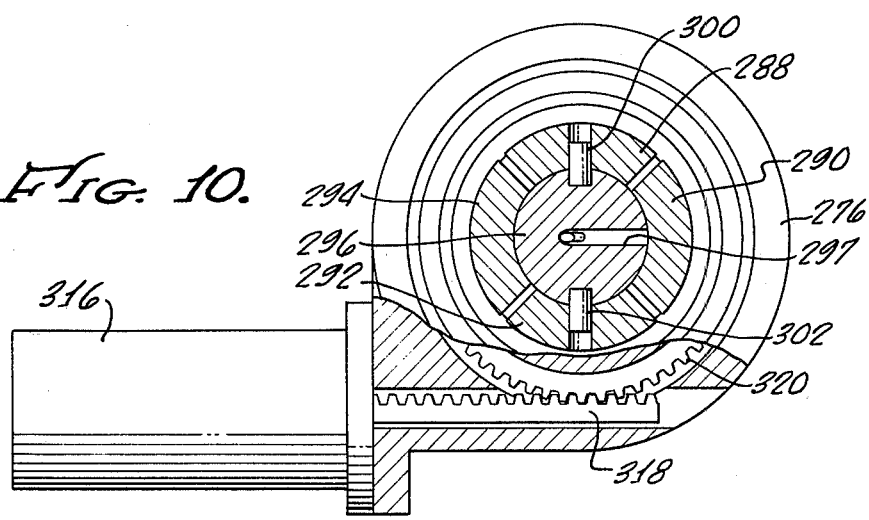
FIG. 10 is a section taken on lines 10—10 of FIG. 9.

Accordingly, the object to be scanned, which is shown in FIG. 8 as a bent tube 270, is carried by a fixed platform 272 suspended from the upper frame 210 and spaced inwardly from the posts to clear the discs 250, 256 as they move to an uppermost position. Fixedly mounted to the platform 272 is rotatable tube support 274 of which details are shown in FIGS. 9 and 10.

The tube support comprises a housing 276 carrying bearings 278, 280 that rotatably mount a tube support body 282 having a tapered recess 284 in a lower end thereof. A split ball collet 286, formed of segments 288, 290, 292, 294 (FIG. 10), has an outer conical surface mating with the surface of the conical recess 284 and also has an inner spherical recess for reception of a ball 296 fixedly carried at the end of a tube support rod 298. Ball 296 carries a pair of diametrically opposed and mutually aligned pivot pins 300, 302 that are fixed to the ball and rotatably received in journal apertures of split collet segments 288, 292 respectively. Thus the ball (and rod 298) can pivot about the axis of the pins 300, 302 in a single plane. Further, the ball together with the split ball collet 286 can readily pivot about an axis aligned with the axis of rotation of support body 282 (when the several components are not locked by the locking means to be described below). Thus a gimbal or universal joint is provided. Ball 296 is formed with an outwardly diverging slot 297 to permit rotation about pivot pins 300, 302 without undue interference with a cable 310 (described below).

Fixed to the other end of support rod 298 is a tube receiving chuck comprising a split chuck collet 304 having a tapered recess that receives a mating tapered plug 306. A compression spring 308 is mounted within the chuck collet, interposed between an end of the plug 306 and an end of support rod 298, to urge the plug outwardly of the tapered recess of chuck collet 304.

A cable receiving aperture extends through plug 306, through support rod 298, through ball 296 and through support body 282. Extending through this aperture and fixed at one end to plug 306 is a flexible cable 310 that is fixed at its other end to reciprocable actuator 312 of an air motor 314 mounted upon the support body 282.

A motor 316 is fixed to housing 276 and drives a rack 318 having teeth thereon that mesh with teeth of a gear 320 fixed to and circumscribing the support body 282. Motor 316 has a preset length of stroke capable of moving rack 318 between extended and retracted positions. When the rack 318 moves from one of its positions to the other, gear 320 and support body 282 rotate through a precise 90°.

Motor 314 is operable to move actuator 312 between an extended and retracted position. In extended position of actuator 312, plug 306 is loose in chuck collet 304 and the ball 296 is loose in ball collet 286. In retracted position of actuator 312, the cable is tensioned to lock both of the collets. Plug 306 is drawn tightly into the tapered recess of the chuck collet to thereby urge the collet segments radially outwardly to firmly grasp the inner surfaces of the end of the tube 270 into which the collet 304 has been inserted. The very same tension on cable 310 axially drives the support rod 298 to drive the ball 296 into ball collet 286, causing the collet segments 288, 290, 292 and 294 to be forced further into the tapered recess of the support body 282, thus more firmly grasping the ball 296 and locking this ball against rotation relative to the collet 286.

In operation of the embodiment of FIGS. 8–10, a tube 270 of which the profile is to be scanned has an end thereof inserted over the collet 304. The angle of support rod 298 is adjusted by moving the rod 298 about the axis of pivot pins 300, 302 and also by rotating the ball collet 286 about the axis of support body 282 until the tube 270 is substantially centrally located within the area of the posts 200, 202, 204 and 206. Motor 314 is actuated to tension the cable and lock both the chuck collet and ball collet in adjusted position. The tube is now supported on the upstanding frame in a fixed position and contacted only at its inner surfaces. The scanner frame is moved to an extreme upper or an extreme lower position. The scanner disc motors are operated in synchronism to rotate discs 250, and 256 in synchronism. Motor 228 is operated to commence to drive the scanner support together with the scanner in a first direction along the tube, downwardly for example, from an extreme uppermost position. Threaded rods 230, 232 are laterally displaced from the axis or rotation of the discs so as to avoid interference with the scanning beam. Outputs of the reference sensor 262 and the beam sensor 260 are processd by the same circuitry as is employed in the previously described embodiment and,